(12) United States Patent
Nazzaro et al.

(10) Patent No.: US 10,200,516 B2
(45) Date of Patent: Feb. 5, 2019

(54) INTERLOCKING CERAMIC AND OPTICAL MEMBERS

(71) Applicant: Apple Inc., Cupertino, CA (US)

(72) Inventors: David I. Nazzaro, Cupertino, CA (US); Naoto Matsuyuki, Tokyo-to (JP); Raul A. Molina, Shenzhen (CN); Fletcher R. Rothkopf, Cupertino, CA (US); Chin San Han, Cupertino, CA (US)

(73) Assignee: APPLE INC., Cupertino, CA (US)

(*) Notice: Subject to any disclaimer, the term of this patent is extended or adjusted under 35 U.S.C. 154(b) by 24 days.

(21) Appl. No.: 14/472,230

(22) Filed: Aug. 28, 2014

(65) Prior Publication Data
US 2016/0066448 A1 Mar. 3, 2016

(51) Int. Cl.
H04M 1/26 (2006.01)
H05K 5/02 (2006.01)
H01L 27/146 (2006.01)
H04M 1/02 (2006.01)

(52) U.S. Cl.
CPC ................. H04M 1/0264 (2013.01)

(58) Field of Classification Search
CPC .. H05K 5/0208; H05K 5/0091; H05K 5/0217; H05K 5/0243; Y10T 428/22; Y10T 428/24347; Y10T 428/24339; H01L 27/14625; H01L 27/14627; H04M 1/0264
USPC ........... 428/67, 172, 140; 348/360; 359/808, 359/811, 819
See application file for complete search history.

(56) References Cited

U.S. PATENT DOCUMENTS

| | | | |
|---|---|---|---|
| 3,217,088 A | 11/1965 | Steirerman |
| 3,424,890 A | 1/1969 | Van Ruyven |
| 3,911,670 A | 10/1975 | Hofer |
| 3,955,021 A | 5/1976 | Cleavenger |
| 4,036,623 A | 7/1977 | Deeg et al. |
| 4,424,435 A | 1/1984 | Barnes, Jr. |
| 4,433,921 A | 2/1984 | Gogniat et al. |

(Continued)

FOREIGN PATENT DOCUMENTS

| | | |
|---|---|---|
| CN | 1561277 | 1/2005 |
| CN | 1757468 | 4/2006 |

(Continued)

OTHER PUBLICATIONS

"Laserstrahlschweissen von Thermoplasten im Durchstrahlverfahren," Technische Information Fuer Experten, pp. 1-8, Feb. 1, 2000.

Primary Examiner — Joanna Pleszczynska
(74) Attorney, Agent, or Firm — Dorsey & Whitney LLP

(57) ABSTRACT

Interlocking first member and optical members and methods of their manufacture. A component formed from an interlocking first member and optical member, where the first member includes a recess formed within a surface and the optical member is disposed in the recess. The recess of the first member may include a recess geometry and the optical member may include a member geometry that may correspond to the recess geometry. Additionally, the interlocking component formed from the first member and optical member may be formed by a coupling process. The coupling process may include sintering the first member and the optical member, bonding the optical member to the first member or providing a compression-load or fit between the first member and the optical member.

27 Claims, 14 Drawing Sheets

(56) References Cited

U.S. PATENT DOCUMENTS

| | | | |
|---|---|---|---|
| 4,636,609 A | 1/1987 | Nakamata | |
| 4,849,299 A | 7/1989 | Loth | |
| 4,879,450 A | 11/1989 | Valentin et al. | |
| 5,028,162 A | 7/1991 | Tsuno et al. | |
| 5,534,103 A | 7/1996 | Yano et al. | |
| 5,893,959 A | 4/1999 | Muellich | |
| 6,210,507 B1 | 4/2001 | Hansen et al. | |
| 6,451,398 B1 | 9/2002 | Sylvester | |
| 6,459,460 B1 | 10/2002 | Yamanaka | |
| 6,464,374 B2 | 10/2002 | Akiyama et al. | |
| 6,501,044 B1 | 12/2002 | Klockhaus et al. | |
| 6,627,814 B1 | 9/2003 | Stark | |
| 6,670,021 B2 | 12/2003 | Schroder et al. | |
| 6,752,893 B2 | 6/2004 | Frieder, Jr. | |
| 6,767,624 B2 | 7/2004 | Bronstert | |
| 6,827,812 B2 | 12/2004 | Woods | |
| 6,936,963 B2 | 8/2005 | Langer et al. | |
| 6,960,738 B2 | 11/2005 | Weekamp et al. | |
| 7,207,634 B2 | 4/2007 | Yamabuki et al. | |
| 7,225,521 B2 | 6/2007 | Krause et al. | |
| 7,440,199 B2 | 10/2008 | Nakai et al. | |
| 7,510,620 B2 | 3/2009 | Terada et al. | |
| 7,561,350 B2 | 7/2009 | Kitamura et al. | |
| 7,635,516 B2 | 12/2009 | Arimitsu et al. | |
| 7,697,281 B2 | 4/2010 | Dabov et al. | |
| 7,776,437 B2 | 8/2010 | Kim | |
| 7,811,647 B2 | 10/2010 | Arimitsu et al. | |
| 7,815,354 B2 | 10/2010 | Yamazaki et al. | |
| 7,842,157 B2 | 11/2010 | Chang et al. | |
| 7,910,206 B2 | 3/2011 | Kiuchi et al. | |
| 7,966,785 B2 | 6/2011 | Zadesky et al. | |
| 8,060,168 B2 | 11/2011 | Horrdin et al. | |
| 8,119,048 B2 | 2/2012 | Nishimura | |
| 8,153,250 B2 | 4/2012 | Nakayama et al. | |
| 8,168,031 B2 | 5/2012 | Katayama et al. | |
| 8,319,741 B2 | 11/2012 | Hirota | |
| 8,346,183 B2 | 1/2013 | Prest et al. | |
| 8,456,812 B2 | 6/2013 | Yuan et al. | |
| 8,570,729 B2 | 10/2013 | Prest et al. | |
| 8,607,444 B2 | 12/2013 | Jarvis et al. | |
| 8,618,437 B2 | 12/2013 | Seita | |
| 8,684,613 B2 | 4/2014 | Weber | |
| 8,705,006 B2 | 4/2014 | Schoeppach et al. | |
| 8,738,104 B2 | 5/2014 | Yeates et al. | |
| 8,780,579 B2 | 7/2014 | Kwon et al. | |
| 8,787,980 B2 | 7/2014 | Hashimoto et al. | |
| 8,797,721 B2 | 8/2014 | Pakula et al. | |
| 8,852,330 B2 | 10/2014 | Naess et al. | |
| 8,937,689 B2 | 1/2015 | Prest et al. | |
| 8,986,844 B2 | 3/2015 | Jeon et al. | |
| 9,005,388 B2 | 4/2015 | Sugiyama et al. | |
| 9,030,835 B2 | 5/2015 | Frenzel et al. | |
| 9,149,998 B2 | 10/2015 | Vienonen et al. | |
| 9,221,289 B2 | 12/2015 | Prest et al. | |
| 9,421,712 B2 | 8/2016 | Arai et al. | |
| 9,507,192 B2 | 11/2016 | Lim et al. | |
| 9,538,052 B2 | 1/2017 | Sanford et al. | |
| 2003/0071269 A1 | 4/2003 | Tseng | |
| 2004/0150688 A1 | 8/2004 | Kwan et al. | |
| 2004/0231788 A1 | 11/2004 | Chen et al. | |
| 2004/0237422 A1 | 12/2004 | Tat et al. | |
| 2005/0067084 A1 | 3/2005 | Kagan et al. | |
| 2007/0194086 A1 | 8/2007 | Yuura | |
| 2008/0024887 A1* | 1/2008 | Noda | G02B 7/021 359/819 |
| 2008/0063218 A1 | 3/2008 | Weber et al. | |
| 2008/0086033 A1 | 4/2008 | Mihalca | |
| 2009/0061145 A1 | 3/2009 | Lin | |
| 2009/0128912 A1* | 5/2009 | Okada | C08J 7/047 359/576 |
| 2009/0181194 A1 | 7/2009 | Zhang et al. | |
| 2009/0297403 A1 | 12/2009 | Franke et al. | |
| 2010/0079877 A1* | 4/2010 | Taki | G02B 7/021 359/820 |
| 2010/0079879 A1* | 4/2010 | Sasaki | G02B 7/023 359/822 |
| 2010/0177409 A1* | 7/2010 | Liu | C03B 11/08 359/819 |
| 2010/0252185 A1 | 10/2010 | Kiuchi et al. | |
| 2010/0279491 A1 | 11/2010 | Kiuchi et al. | |
| 2011/0050053 A1 | 3/2011 | Deng | |
| 2011/0110213 A1 | 5/2011 | Arai et al. | |
| 2011/0111176 A1 | 5/2011 | Chiu et al. | |
| 2012/0031665 A1 | 2/2012 | Dai et al. | |
| 2012/0099259 A1 | 4/2012 | Park | |
| 2012/0244343 A1 | 9/2012 | Stiehl | |
| 2013/0034676 A1 | 2/2013 | Casebolt | |
| 2013/0034727 A1 | 2/2013 | Casebolt | |
| 2013/0162891 A1* | 6/2013 | Wang | G02B 7/025 348/360 |
| 2013/0236699 A1 | 9/2013 | Prest et al. | |
| 2014/0023430 A1 | 1/2014 | Prest et al. | |
| 2014/0072794 A1 | 3/2014 | Rundle et al. | |
| 2014/0119042 A1 | 5/2014 | Sagesaka et al. | |
| 2014/0139978 A1* | 5/2014 | Kwong | H04M 1/0202 361/679.01 |
| 2014/0192467 A1* | 7/2014 | Kwong | G06F 1/1601 361/679.3 |
| 2014/0216914 A1* | 8/2014 | Pope | G06F 3/044 200/600 |
| 2014/0364811 A1 | 12/2014 | Holtwick et al. | |
| 2015/0197074 A1 | 7/2015 | Takahashi | |
| 2015/0208539 A1 | 7/2015 | Blunier et al. | |
| 2015/0280767 A1 | 10/2015 | Ames et al. | |
| 2017/0095971 A1 | 4/2017 | Pullini | |

FOREIGN PATENT DOCUMENTS

| | | |
|---|---|---|
| CN | 101088961 | 12/2007 |
| CN | 101634186 | 1/2010 |
| CN | 101693629 | 4/2010 |
| CN | 101815594 | 8/2010 |
| CN | 201804749 | 4/2011 |
| CN | 102089898 | 6/2011 |
| CN | 102528276 | 7/2012 |
| DE | 4432081 | 3/1996 |
| DE | 10027073 | 8/2001 |
| EP | 1270183 | 11/2003 |
| EP | 1837831 | 9/2007 |
| JP | 56005363 | 1/1981 |
| JP | S56164040 | 12/1981 |
| JP | S57108688 | 7/1982 |
| JP | S60080784 | 5/1985 |
| JP | S60247486 | 12/1985 |
| JP | S61077786 | 4/1986 |
| JP | S61294385 | 12/1986 |
| JP | S62064528 | 3/1987 |
| JP | S6271626 | 4/1987 |
| JP | H08051285 | 2/1996 |
| JP | 8213928 | 8/1996 |
| JP | 2001071384 | 3/2001 |
| JP | 2003253228 | 9/2003 |
| JP | 2003320585 | 11/2003 |
| JP | 2004333946 | 11/2004 |
| JP | 2004354438 | 12/2004 |
| JP | 2005104092 | 4/2005 |
| JP | 2005297225 | 10/2005 |
| JP | 2005300621 | 10/2005 |
| JP | 2006141152 | 6/2006 |
| JP | 2006341515 | 12/2006 |
| JP | 2008052134 | 3/2008 |
| JP | 2008284782 | 11/2008 |
| JP | 2009226643 | 10/2009 |
| JP | 2010274279 | 12/2010 |
| JP | 2011122458 | 6/2011 |
| JP | 201107056 | 10/2011 |
| JP | 201495515 | 5/2014 |
| JP | 2015093456 | 5/2015 |
| TW | 200307310 | 11/2004 |
| TW | 200812807 | 3/2008 |
| TW | 200915869 | 4/2009 |
| TW | 201214238 | 4/2012 |

(56) References Cited

FOREIGN PATENT DOCUMENTS

| WO | WO2005/017429 | 2/2005 |
|----|---------------|--------|
| WO | WO2006/048500 | 5/2006 |
| WO | WO2006/090003 | 8/2006 |

* cited by examiner

INTERLOCKING CERAMIC AND OPTICAL MEMBERS

TECHNICAL FIELD

The embodiments described herein generally relate to ceramic components and, more particularly, to interlocking ceramic and optical members and techniques for manufacturing the same.

BACKGROUND

Ceramic components are useful in a wide array of products due to their physical properties and characteristics. For example, ceramic and ceramic-based materials typically have high strength and light weight.

Because some ceramics are optically opaque, it is often useful to remove material to form holes to provide an optical window for other components, particularly those requiring an optical stimulus (e.g., cameras) or those generating a visual stimulus (e.g., display or light source). One solution is to insert an optical member into a hole formed in the ceramic material.

However, conventional methods of inserting optical members into a ceramic housing rely on the use of adhesives or other bonding agents for mechanical integrity, or may require the use of additional structures, such as bezels. Some conventional methods of inserting optical members into a ceramic material may result in a product having a potentially weak region around the optical member. In addition, some conventional methods may result in unsatisfactory environmental permeability, which may increase the risk of ingress of water or debris. While the permeability may be improved by forming a bezel over the region, the use of bezels and other structures may increase the size and weight of the device, and may also require a relatively large amount of surface area.

SUMMARY

Generally, embodiments discussed herein relate to ceramic components, more particularly to interlocking ceramic and optical members, and methods of their manufacture. In particular, the invention relates to an interlocking ceramic housing (member) and optical member, where the ceramic housing may include a recess formed within a surface, and the optical member may be disposed in the recess. The recess of the ceramic housing and the optical member may have geometries that are configured to mechanically interlock when the optical member is disposed in the recess. In one example, the recess may include a geometry including a first width at the surface and a second width at a depth within the recess, where the first width may be less than the second width, and where the component may be formed by sintering. In certain embodiments, the ceramic housing may have a higher coefficient of thermal expansion than the optical member, and the optical member may also be compression-loaded after sintering of the ceramic housing.

In some embodiments, the geometry of the recess may include an undercut geometry, tapered geometry, or counterbored geometry with respect to the surface. In additional embodiments, the geometry of the optical member may correspond to the geometry of the recess. The geometry of the optical member may, in some embodiments, be protruding with respect to the surface or recessed with respect to the surface.

In other embodiments, the optical member may include a translucent, transparent, or optically clear material. This material may be one that retains its shape at a temperature of 1400° C., and in certain embodiments may be, for example, sapphire glass. In some embodiments, the optical member may include multiple segments, which may be arranged in a layered or sandwiched arrangement, and may optionally include a transparent member between the segments, for example one or more of an optical or visual material. The optical member may include or be used in one or more of a window, control, or display.

In additional embodiments, the housing may include multiple segments. The inner surface of the recess on the housing may also be coated with ink. In yet another embodiment, the component may further include an adhesive, chemical bonding agent, or sealant disposed between the recess and the optical member, which in some embodiments may be zirconia or ceramic slurry. In some embodiments, the composition may be water resistant or water proof.

Embodiments of the invention also relate to methods of manufacturing an interlocking ceramic and optical member. The methods may include disposing an optical member into the recess of a ceramic housing having a recess formed within a surface, sintering the ceramic housing to reduce the size of said recess, and cooling the housing. The recess may include a geometry comprising a first width at the surface and a second width at a depth within the recess, where the first width may be less than the second width. Further, the component may be formed by sintering. In a particular embodiment, the size of the recess may be reduced by 20-50% in all directions after sintering, and in some embodiments the member may be compression-loaded after sintering.

In some embodiments, the recess may have an undercut geometry, tapered geometry, or counterbored geometry. In additional embodiments, the geometry of the optical member may correspond to the geometry of the recess. The geometry of the optical member may be protruding or recessed with respect to the recess. In one embodiment, the optical member may include sapphire glass. In some embodiments, the optical member may include multiple segments, which may be sandwiched, and may optionally include a transparent member between the segments, for example one or more of an optical or visual material. The optical member may include or be used in one or more of a window, control, or display. In additional embodiments, the housing may include multiple segments. The inner surface of the recess on the housing may also include a visual material.

The methods may also include tuning the remaining gap between the recess and the optical member after sintering or cooling, and may include disposing an adhesive, chemical bonding agent, or sealant between the recess and optical member. In some embodiments, the adhesive, chemical bonding agent, or sealant may be zirconia or ceramic slurry.

BRIEF DESCRIPTION OF THE DRAWINGS

The described embodiments will be readily understood by the following detailed description in conjunction with the accompanying drawings, wherein like reference numerals designate like structural elements, and in which.

Figure 1A:
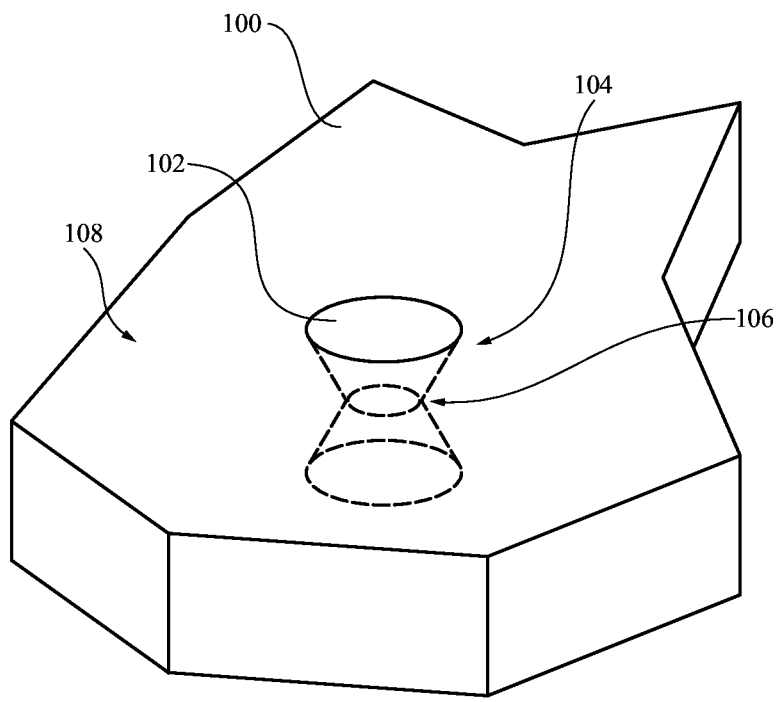
FIG. 1A shows an illustrative perspective view of a portion of a ceramic housing having a recess formed within a surface, according to embodiments.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

The following detailed description relates generally to ceramic components, more particularly to interlocking ceramic and optical members, and methods of their manufacture. Numerous specific details are set forth to provide a thorough understanding of the concepts underlying the embodiment described herein and in the figures. However, the following descriptions are not intended to limit the embodiments to one preferred embodiment. To the contrary, this application contemplates alternatives, modifications, and equivalents as can be included within the spirit and scope of the described and illustrated embodiments as defined by the appended claims. Embodiments are discussed below with reference to the Figures.

FIG. 1A is a perspective view of a portion of a ceramic housing 100 in accordance with an embodiment. The housing 100 may be of any shape, and is shown in its simplest form as a planar sheet having a vertical thickness. In some embodiments, the housing 100 can be the housing of an electronic device, including but not limited to a cellular phone, tablet device, media device, or personal computer. The housing 100 may be integrated into a larger device, or may itself substantially define the shape and form of the device.

During the manufacture of the final part, the housing 100 may be formed using green-state ceramic materials (also herein referred to as "green body"), which may include a variety of ceramic materials that has not been fully heat treated or cured. In some cases, the green body retains the ability to undergo expansion upon heating or sintering. In non-limiting examples, ceramics may include both clay and non-clay inorganic materials, and both oxides and non-oxides, as understood in the art. In typical embodiments, ceramics include one or more of alumina, zirconia, carbides, borites, nitrides, and silicides. Production of ceramics typically involve creating a material powder, shaping a green body, and then heating or firing ("sintering") the composition at 1600° C. to 1800° C.

The housing 100 may be created by any process or method of shaping ceramic, as understood in the art. For example, in some embodiments the housing 100 is cast in shape from a ceramic-based slurry mixture. In other embodiments, the housing 100 is removed, cut, or milled from a larger piece. The ceramic material selected generally depends on many factors including, but not limited to, strength (tensile), density (light weight), strength to weight ratio, Young's modulus, corrosion resistance, formability, finishing, recyclability, tooling costs, electrical and/or thermal conductivity, radio wave transparency, and aesthetic qualities. In a non-limiting example, the ceramic may include zirconia, which may provide adequate RF transmission, as well as environmental protection for internal electrical components. In some embodiments, the housing 100 may be multiple layers or sheets, and may optionally include additional materials and components. The housing 100 may also be of any thickness, which will vary depending on the use of the final composition.

As shown in FIG. 1A, the housing 100 includes a recess 102 formed within a surface. The recess 102 may be of any suitable size, which is determined by the specific application. In a non-limiting example, a relatively small recess 102 on a surface 108 may be utilized for a camera system in an electronic device (see, FIGS. 7A and 7B); while a relatively large recess 102 on the surface 108 may be utilized for a protective cover for a display of the electronic device. A "surface," as used herein, may be any suitable structure or housing formed from any suitable material including, but not limited to, glass, ceramic (of which sapphire, zirconia and alumina are examples), metal, wood, plastic and other polymers, and so on.

The recess 102, when viewed from above, may be of any shape depending on the application, and may include but is not limited to a circle, square, or rectangle. In some embodiments, the recess 102 may pass completely through the housing 100, or may pass through multiple separate or integrated sheets, such as through layered ceramic compositions or the hollow housing of an electronic device (see, FIG. 7A and FIG. 7B). In other embodiments, the recess 102 may not pass completely through the housing, and may be formed such that some material is left around at least the bottom or top of the recess.

Figure 1B:
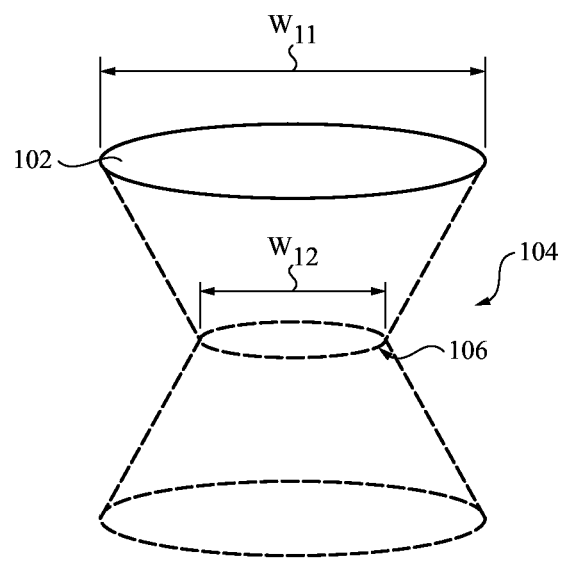
FIG. 1B shows an illustrative perspective view of the geometry of the recess formed within the surface of the ceramic housing of FIG. 1A, according to embodiments.

As shown in FIGS. 1A and 1B, the recess 102 has geometry 104, which comprises a first width ($W_{11}$) at the surface 108 and a second width ($W_{12}$) at a depth 106 within the recess 102. The first width ($W_{11}$) may be greater than the second width ($W_{12}$). The geometry 104 is configured to provide a mechanical interlock with an optical member (see, FIGS. 3A-3D) after the ceramic material of the housing undergoes heat expansion. The geometry 104 may be created by any suitable process, including but not limited to casting or milling. Non-limiting examples for geometry 104 may include an undercut geometry, tapered geometry, or counterbored geometry. "Undercut" as used herein may refer to the profile shape of an object where at least one diameter or dimension perpendicular to and along a vertical axis of a recess is smaller than the largest diameter or dimension of one or both of the vertical axis endpoints located at an end of the recess, as understood in the art. Objects with an undercut geometry may appear to have material removed, such as a reduction in the middle diameter of a 3D object such as a cube or cylinder. "Tapered" as used herein may refer to the profile shape of an object where at least one diameter or dimension perpendicular to the vertical axis is larger than the diameter or dimension of one of the vertical endpoints. A tapered geometry may also refer to the profile geometry of an object capable of interlocking with an object having undercut geometry. "Counterbored" may refer to a geometry in which one of the vertical endpoints is significantly larger in diameter than a nearby vertical point, and may refer to a recess that is formed using a counterboring process. In some cases, counterbored be referred to interchangeably with tapering.

"Interlocking" as used herein may refer to the property of two or more objects that physically engage each other or fit together due to their geometry, i.e. corresponding projections and recesses. In some cases, interlocking components or members are retained in place by a mechanical engagement or overlap between the two pieces. It is envisioned that various geometric configurations may result in interlocking, and that all are within the scope of the invention. In non-limiting examples, interlocking geometry may incorporate various features, such as but not limited to hooking or dovetailing. In some embodiments, interlocking results in enhanced resistance to mechanical forces from one or more directions, increasing the strength of a composition incorporating multiple objects.

Because a ceramic material may have a higher coefficient of thermal expansion, as compared to other materials typically incorporated into ceramic housings (such as, windows and electronics), a sintering process may be used to retain a component or member within a ceramic material. For example, an object having a thermal expansion that is less than the ceramic material can be placed into a recess in the ceramic housing 100 and be retained in the recess after the housing 100 is heated. In some cases, heat expansion of the ceramic forming housing 100 will reduce the size of recess 102, and/or substantially expand the size housing 100. In some examples, recess 102 may be reduced in size by 20-45% in both diameter and thickness. This technique has the advantage of relying on the geometric configuration of two or more high-strength objects to keep a material in place, increasing the overall strength of the composition to at least around that of the other object, instead of including an undesirable bezel.

A non-limiting example of the geometry 104 is provided in FIGS. 1A and 1B, showing recess 102 as tapered or hour glass shaped. However, geometry 104 may include any profile where at least one point of recess 102 has a smaller diameter or width (e.g., second width $W_{12}$) than an endpoint width (e.g., first width $W_{11}$). In some embodiments, there may be additional materials around at least one of the vertical endpoints, such as where the recess 102 does not pass completely through the housing 100, as discussed above.

The composition may also have additional visual materials or treatments along the inner surface or depth 106 of the recess 102. In some examples, a visual material or treatment may provide a desired visual appearance of a device by, for example, incorporating a design, pattern, color, or light element. Visual materials or treatments may also have functional properties. In some embodiments, the visual materials or treatments include a color or pattern that is applied to the recess when the material is in a green state. The visual material or treatment may include any suitable material such as a metal anodized material or dye, or may be formed using an etching or patterning process. In some embodiments, the visual materials include adhesives or other binding agents applied before or after sintering, and may have additional functionality, such as strengthening the product.

Figure 2A:
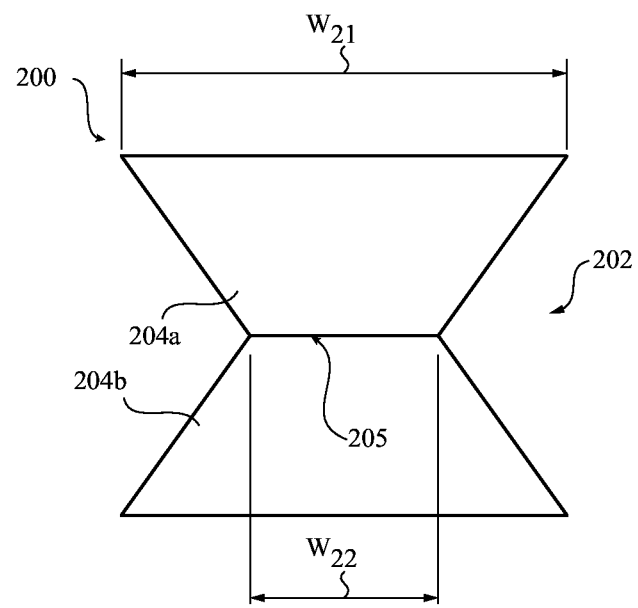
FIG. 2A shows an illustrative front view of an optical member, according to embodiments.
Figure 2B:
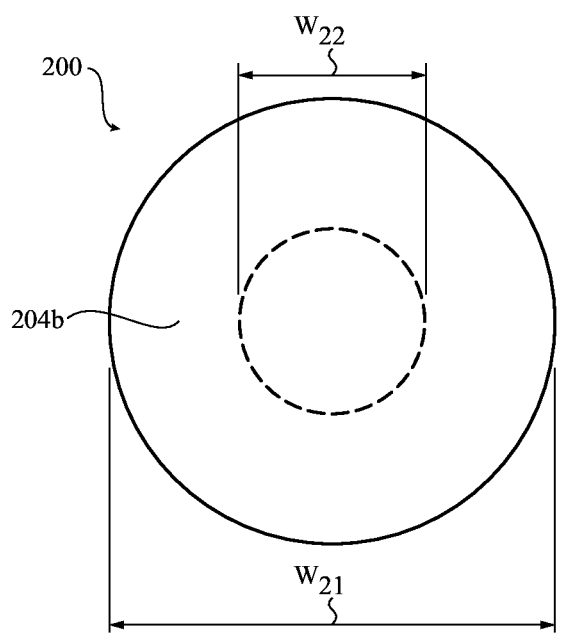
FIG. 2B shows an illustrative plane view of an optical member, according to embodiments.

FIGS. 2A and 2B show a front and top view, respectively, of an optical member 200. Optical members 200 are useful to transmit light to or from the housing 100, as the housing 100 is generally made from ceramic and does not transmit light through its surfaces. In some embodiments, the optical member 200 is a translucent, transparent, or optically clear material, such as sapphire glass, however it may be made from any light transmitting material. Exemplary optical materials and optical members 200 are objects and devices having the property of transforming, reshaping, or altering the direction or path of a light input. In some embodiments, optical devices may transform a light input into an electrical image. The devices may be part of or comprise a larger functional unit, such as but not limited to a window, control, or display. Some materials may be optically clear, having the property of transmitting one or more wavelengths of light without significantly transforming, reshaping, or altering its direction or path.

Non-limiting examples of optically clear materials may include glass, e.g., sapphire, and optically clear adhesives. Because sintering may require local temperatures in excess of 1400° C., the optical member 200 may incorporate materials that can withstand high temperatures, (e.g., sapphire glass). In some embodiments, the optical member 200 may have a lower coefficient of thermal expansion than the housing 100. Sapphire glass is an exemplary material providing high light transmission, durability, and minimal thermal expansion in optical members 200.

Figure 3A:
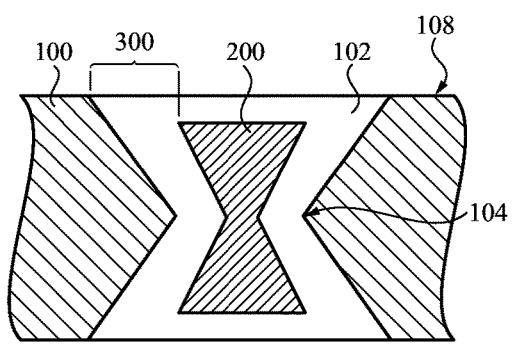
FIG. 3A shows an illustrative front cross-sectional view of an interlocking ceramic housing and an optical member before performing a sintering process, according to embodiments.

As shown in FIG. 2, the optical member 200 has geometry 202, which may facilitate interlocking with recess 102 on housing 100 (see, FIG. 1A) after sintering. In some embodiments, the geometry may substantially correspond with that of recess 102, and may have tapered geometry or undercut geometry. As discussed herein, the optical member 200 may be smaller or larger than the final sintered geometry of the housing 100, resulting in a protruding or recessed optical member 200 along the surface 108 of the housing 100. As shown in FIG. 2A, the optical member 200 comprises multiple joined members 204a, 204b. More specifically, optical member 200 may be formed from distinct joined members 204a, 204b. As shown in FIGS. 2A and 3A, joined members 204a, 204b may be joined at a surface 205 prior to further processing involving optical member 200. Joined members 204a, 204b may be joined at a surface 205 using any suitable joining technique or component including, but not limited to, a bonding agent, welding the edges, melting and the like, as discussed herein. In another non-limiting embodiment, and as discussed herein with respect to FIGS. 8A-8C, joined members 204a, 204b may be joined after positioning one of the joined members 204a, 204b within housing 100. This design allows additional optical or visual materials to be placed between sandwiched layers of the optical material, e.g., sapphire, enhancing the function and aesthetic design of the composition.

Additionally, and as discussed herein, optical member 200 may include geometry 202 corresponding to the geometry 104 of housing 100. As shown in FIGS. 2A and 2B, optical member 200 includes a first width ($W_{21}$) and a second width ($W_{22}$). Similar to geometry 104 of recess 102 of housing 100, the first width ($W_{21}$) of geometry 202 of optical member 200 may be less than the second width ($W_{22}$) of optical member 200.

Figure 3B:
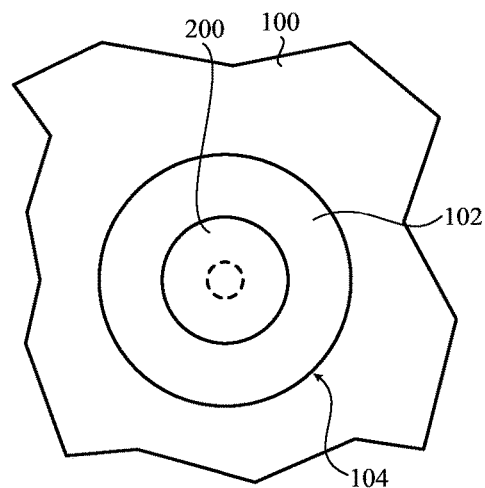
FIG. 3B shows an illustrative plane perspective view of the interlocking ceramic housing and optical member of FIG. 3A before performing a sintering process, according to embodiments.

FIG. 3A provides an illustrative front cross-sectional view of the interlocking ceramic housing 100 and optical member 200 before sintering, e.g., in a green state. FIG. 3B shows an illustrative top view of the same in FIG. 3A before sintering. The geometry 104 of the housing 100 and the geometry 202 of optical member 200 allows optical member 200 to be disposed 300 into recess 102. That is, optical member 200 may be smaller in size than recess 102 of housing 100, such that optical member 200 may be disposed and/or positioned directly within recess 102 prior to sintering housing 100. Additionally, as shown in FIG. 3A, and as discussed herein, geometry 202 of optical member 200 may correspond to geometry 104 of housing 100. That is, geometry 202 of optical member 200 may be correlative and/or may substantially match geometry 104 of recess 102.

Figure 3C:
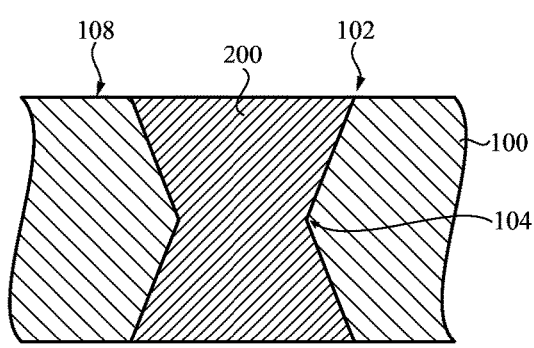
FIG. 3C shows an illustrative front cross-sectional view of the interlocking ceramic housing and the optical member of FIG. 3A after performing a sintering process, according to embodiments.
Figure 3D:
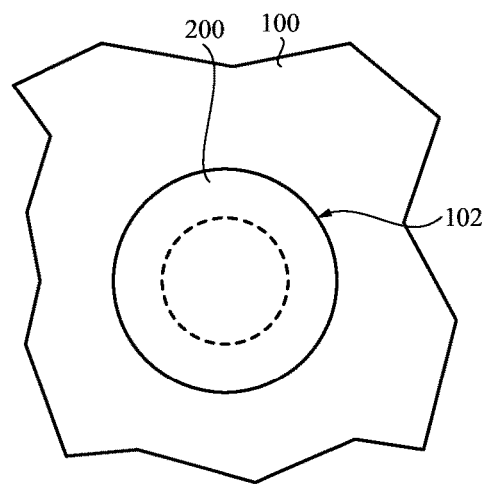
FIG. 3D shows an illustrative plane perspective view of the interlocking ceramic housing and the optical member of FIG. 3A after performing a sintering process, according to embodiments.

FIG. 3C shows an illustrative front cross-sectional view after sintering, and FIG. 3D shows an illustrative top view after sintering, according to embodiments. In this example, the housing 100 undergoes more heat expansion than optical member 200 during a sintering process, resulting in interlocking housing 100 with the optical member 200. In some implementations, during the sintering process, housing 100 and optical member 200 may both undergo heat expansion and increase in size. Specifically, as shown in FIGS. 3C and 3D, housing 100 may increase in size and may ultimately reduce the size of recess 102. Additionally, optical member 200 may also increase in size and substantially fill the reduced size of recess 102. As a result of the specific coefficient of thermal expansion for each material forming housing 100 and optical member 200, respectively, the expansion of each component may vary. In this particular example, the material forming housing 100 may have a higher coefficient of thermal expansion than the material forming optical member 200. As a result of the specific and distinct coefficients of thermal expansions, and as shown in FIGS. 3C and 3D, the expansion of size in housing 100 (e.g., reduction in size of recess 102) may be greater than the expansion of size in optical member 200.

Figure 4A:
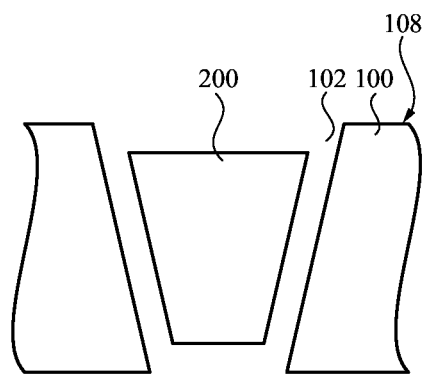
FIG. 4A shows an illustrative front cross-sectional view of an interlocking ceramic housing and an optical member before performing a sintering process, according to additional embodiments.
Figure 4B:
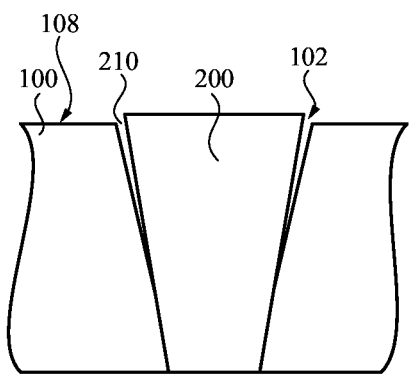
FIG. 4B shows an illustrative front cross-sectional view of the interlocking ceramic housing and the optical member of FIG. 4A after performing a sintering process, according to additional embodiments.

FIGS. 4A and 4B show a front cross-sectional view of the interlocking ceramic housing 100 and optical member 200 before sintering and after sintering, respectively. The sintering process performed on ceramic housing 100 and optical member 200 may be substantially similar to the sintering process discussed herein with respect to FIGS. 3A-3D. However, distinct from FIGS. 3A-3D, housing 100 and optical member 200 may include tapered geometries. It is understood that similarly named components or similarly numbered components may function in a substantially similar fashion, may include similar materials and/or may include similar interactions with other components. Redundant explanation of these components has been omitted for clarity.

As shown in FIG. 4B, subsequent to the sintering process, optical member 200 may extend beyond surface 108 of housing 100. That is, a portion of optical member 200 may expand about surface 108 and out of recess 102 of housing 100 as a result of sintering housing 100 and optical member 200. By extending above surface 108 of housing 100, optical member 200 may require further processing to make optical member 200 aligned with surface 108. Additionally, optical member 200 extending above surface 108 may more clearly define optical member 200 within housing 100 to a user. For example, a user touching housing 100 including optical member 200 may more clearly, and distinctly feel optical member 200 as a result of a portion of the optical member 200 extending above surface 108 of housing 100.

Additionally as shown in FIG. 4B, a space or gap 210 may exist between housing 100 and optical member 200 after a sintering process is performed. That is, and with comparison to FIG. 3C, optical member 200 may expand as a result of the sintering process, but may not completely fill at least a portion of reduced recess 102 of housing 100. As such, gap 210 may be formed with in recess 102 between housing 100 and optical member 200. Additionally, as shown in FIG. 4B, a portion of optical member 200 may substantially fill a portion of recess 102 of housing 100, which may have an interlocking or coupling affect between the portion of optical member 200 and housing 100.

Figure 4C:
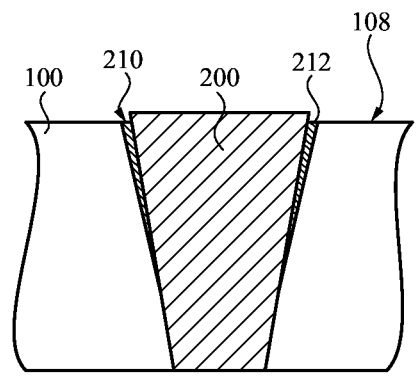
FIG. 4C shows an illustrative front cross-sectional view of the interlocking ceramic housing and the optical member of FIG. 3A including a bonding agent, according to additional embodiments.

Turning to FIG. 4C, a front cross-sectional view of the interlocking ceramic housing 100 and optical member 200 is shown after sintering, similar to FIG. 4B. However, as shown in FIG. 4C, gap 210 formed between housing 100 and optical member 200 may be substantially filled with bonding agent 212. Specifically, gap 210 may be filled with the bonding agent 212 to complete the interlocking between housing 100 and optical member 200 after a sintering process is performed on the like. The bonding agent 212 may include an adhesive, a chemical bonding agent or any suitable sealant that may be disposed within gap 210. In a non-limiting example, bonding agent 212 may include an adhesive formed from zirconia slurry that may be disposed in gap 210, and subsequently cured to interlock optical member 200 to housing 100 where gap 210 exists between the respective components.

Figure 5A:
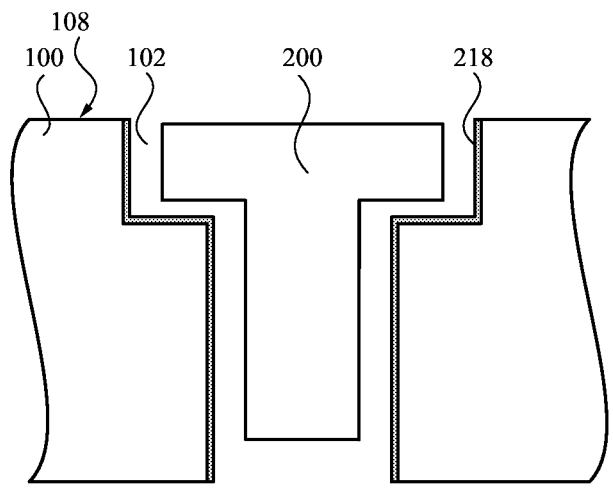
FIG. 5A shows an illustrative front cross-sectional view of an interlocking ceramic housing having an ink coating and an optical member before performing a sintering process, according to another embodiment.
Figure 5B:
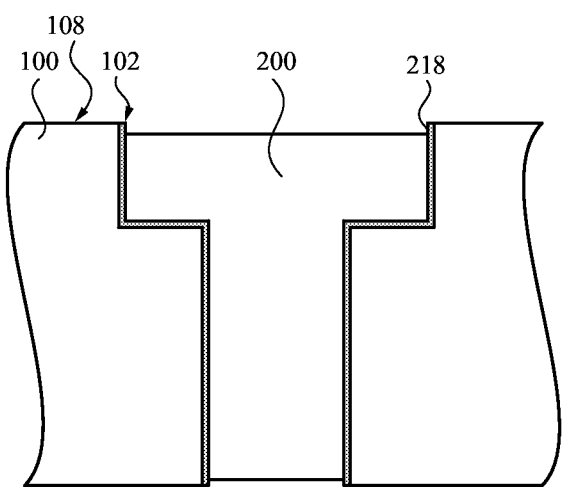
FIG. 5B shows an illustrative front cross-sectional view of the interlocking ceramic housing having an ink coating and the optical member of FIG. 5A after performing a sintering process, according to another embodiment.

FIGS. 5A and 5B show a front cross-sectional view of the interlocking ceramic housing 100 and optical member 200 before sintering and after sintering, respectively. Compared to FIGS. 3A-4C, housing 100 and optical member 200 may include another distinct geometry. Specifically, housing 100 and optical member 200 may include a counterbored geometry.

Additionally, as shown in FIGS. 5A and 5B, housing 100 may include an ink 218. More specifically, housing 100 may include an ink 218 disposed over the inner surface of recess 102. As shown in FIGS. 5A and 5B, ink 218 may remain within recess 102 of housing 100 through the sintering process. That is, as the sintering process is performed on the housing 100 and optical member 200, ink 218 may remain on the surface of recess 102 of housing 100. Ink 218 may be a decorative ink for providing a visually appealing color, image and/or border of recess 102 and/or optical member 200 to a user. Additionally, ink 218 may include a reflective ink that may reflect light emitted through optical member 200, as discussed herein.

Also shown in FIG. 5B, optical member 200 may be formed below surface 108 of housing 100. That is, and opposite optical member 200 discussed in FIG. 4B, a sintering process performed on housing 100 and optical member 200 may result in optical member 200 including a portion positioned below surface 108 of housing 100. However, similar to the effects discussed herein with respect to FIG. 4B, optical member 200 positioned below surface 108, as shown in FIG. 5B, may provide a tactile and/or visual indicator to the user of optical member 200 positioned in housing 100.

Figure 6:
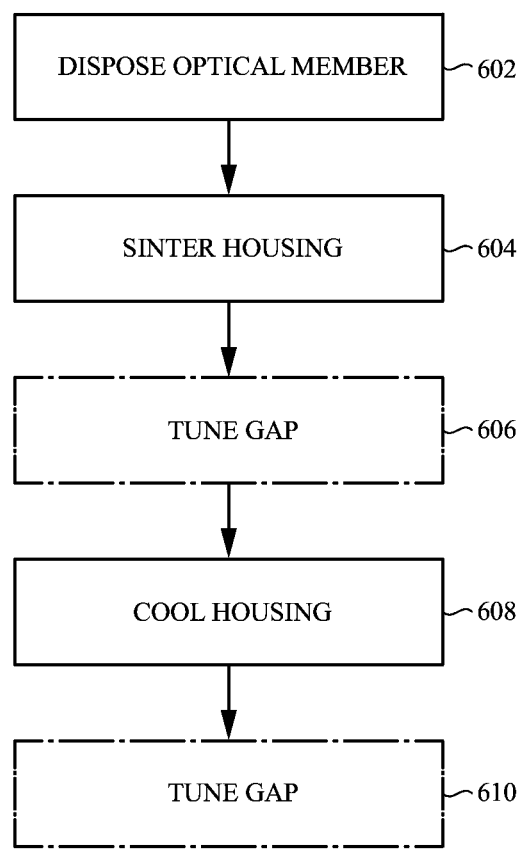
FIG. 6 is a flow chart illustrating a method of manufacturing an interlocking ceramic and an optical member, according to embodiments.

FIG. 6 is a flow chart illustrating a method of manufacturing an interlocking ceramic and optical member, according to embodiments. In operation 402, an optical member 200 having geometry 202 may be disposed into recess 102 of a first member (ceramic housing 100). Once disposed into recess 102, the first member may be sintered in operation 404. The sintering may result in heat expansion of the ceramic and reduction in the size of the recess 102. Reduction in the size of recess 102 results in the interlocking of the first member (housing 100) and member 200 due to their respective geometries 104 and 202. In optional operation 406 (shown in phantom), the remaining gap between recess 102 and member 200 may be tuned. Tuning may be performed by additional heat application, or may involve the use of adhesives or binding agents, as discussed above. The first member is then cooled in operation 408, resulting in an interlocking composition. In an additional, optional operation 410 (shown in phantom), subsequent tuning may be performed at this time on the first member (housing 100) and optical member 200.

Figure 7A:
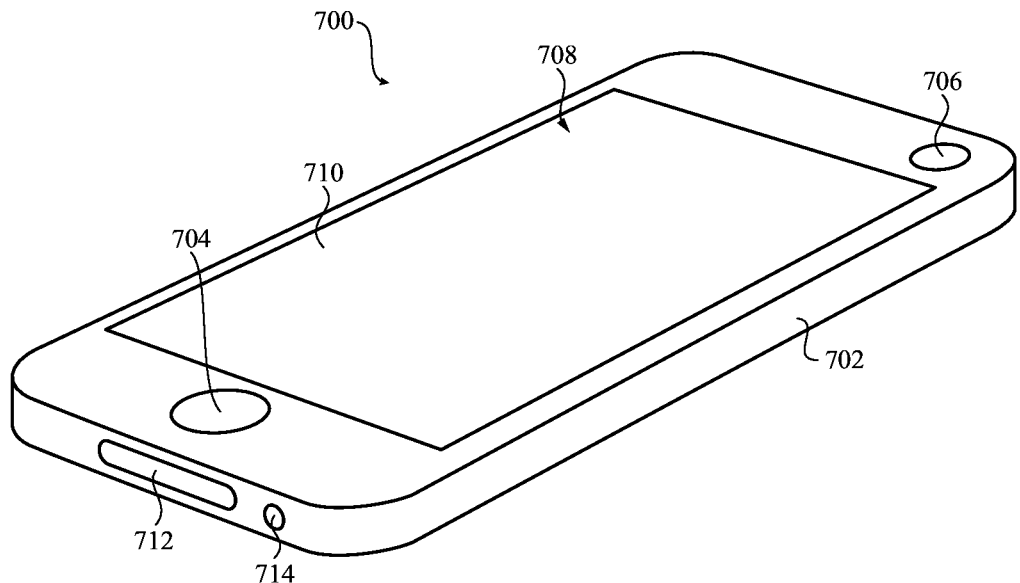
FIG. 7A is an illustrative front perspective view of an electronic device incorporating an interlocking ceramic and an optical member according to embodiments.
Figure 7B:
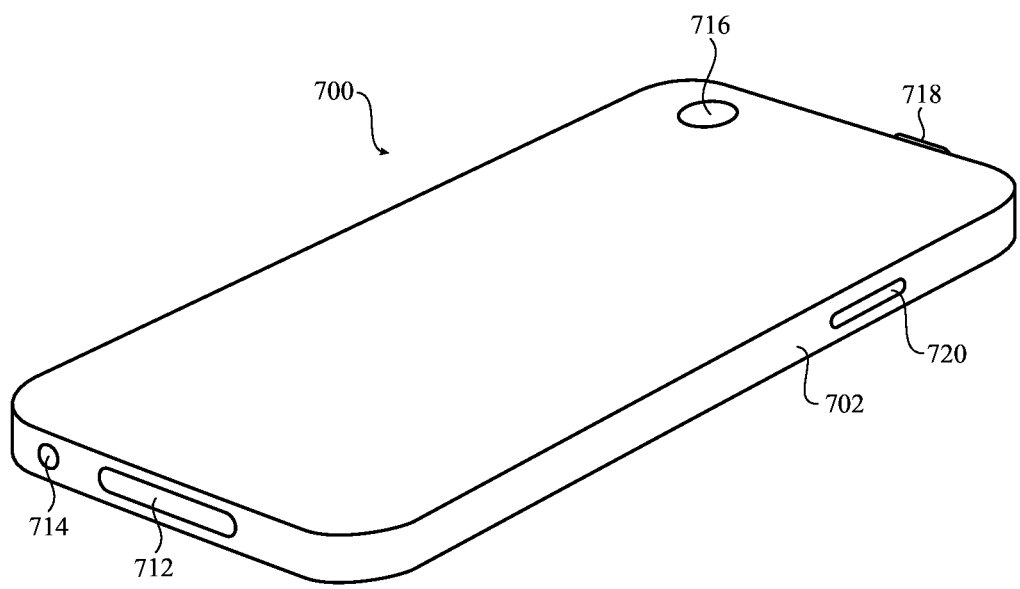
FIG. 7B is an illustrative back perspective view of the electronic device incorporating the interlocking ceramic and the optical member of FIG. 7A, according to embodiments.

FIG. 7A is an illustrative perspective view of an electronic device 700 incorporating an interlocking ceramic and optical member according to embodiments. FIG. 7B is an illustrative back perspective view of an electronic device 700 incorporating an interlocking ceramic and optical member according to embodiments. Due to the properties and characteristics of ceramic, ceramic components are highly useful in the construction of portable electronic devices. Modern portable electronic devices, for example laptop computers, tablet computers, PDAs, media players, cellular phones, and smart phones, are often be light weight, durable, and capable of wireless communication. Ceramic components are useful, for example, as a casing for these devices, and can hold and protect the delicate internal electronics while presenting a comfortable and aesthetically pleasing exterior. However, device screens, touch-sensitive buttons and controls, cameras, and other optical inputs often require the use of non-ceramic other materials to achieve the desired functionality and protection.

Typically, the electronic device 700 comprises one or more of a housing 702, display 708, cover glass 710, input button 704, data and/or power connector 712, audio jack or other port 714, front facing camera 706, rear facing camera 716, power switch 718, and volume control 720.

In embodiments, the housing 702 may include a ceramic. One or more of the display 708, cameras 706 and 716, input interfaces 704, 718 and 720, and component inputs 712 and 714 may comprise an optical member 200 (see, FIGS. 2A-3D) requiring a recess in the housing 702 formed from ceramic. One or more of these recesses may be a recess 102 as described above, having geometry 104, and one or more of the optical members 200 may have geometry 202. Interlocking the housing 702 and optical member 200 forming various components of the electronic device 700 (e.g., display 708, cameras 706 and 716) according to the methods above has the benefits of providing a desirable bond and aesthetically pleasing design. The electronic device 700 retains the desirable material properties of the ceramic housing, but still allows optical communication to and from a user of said electronic device 700. Additionally, large bezels are not required, allowing larger screens and input devices relative to a surface are of the electronic device 700. The electronic device 700 may also be substantially seamless, improving the water resistance, durability, longevity, and cleanliness of the electronic device 700. Even further, the aesthetic appeal and tactile feel of the electronic device 700 are improved by removing protrusions from the housing 702.

Figure 8A:
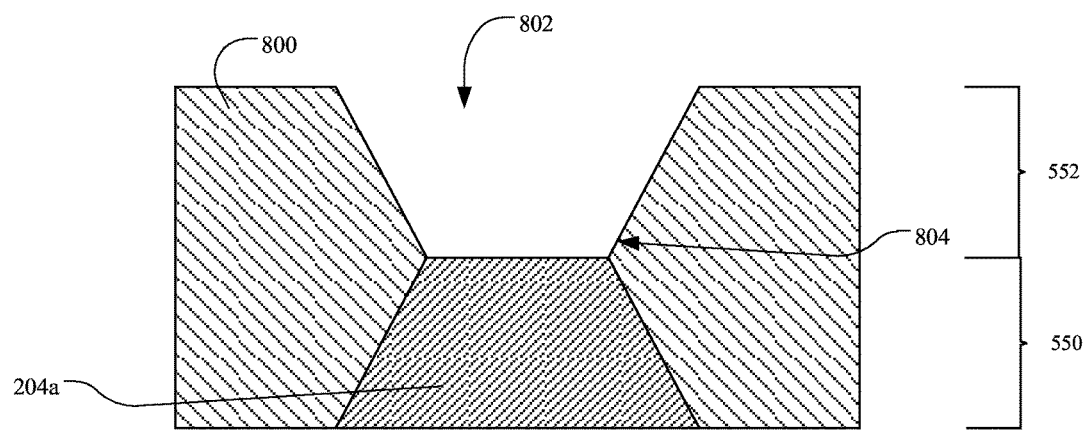
FIGS. 8A-8C are illustrative front cross-sectional views of an interlocking ceramic housing and the optical member of FIG. 2A undergoing assembly processes, according to further embodiments.
Figure 8B:
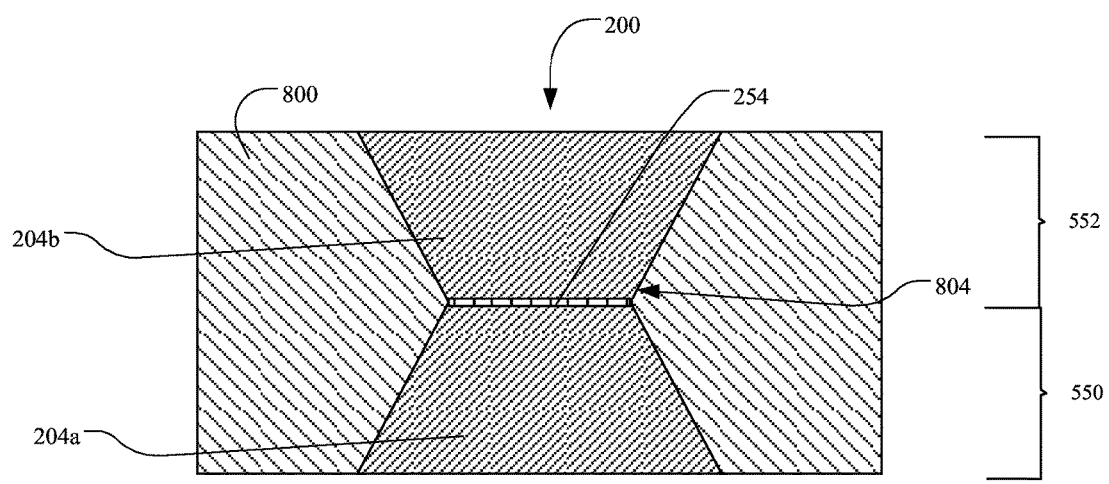
Figure 8C:
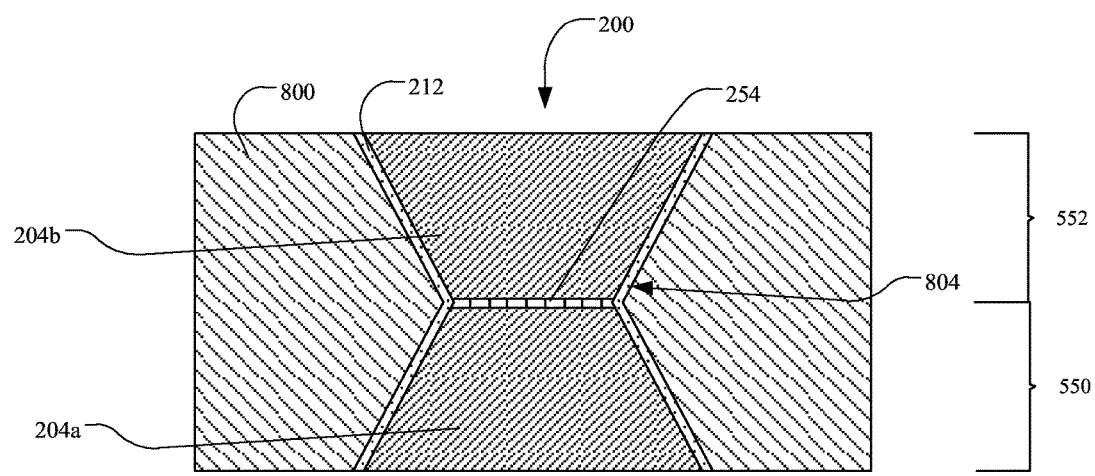

FIGS. 8A-8C depict illustrative cross-section views of the optical member 200 being positioned within a distinct housing 800. More specifically, FIGS. 8A-8C depict optical member 200 including joined members 204a, 204b, as discussed herein with respect to FIG. 2A, positioned, coupled and/or fixed within housing 800.

As shown in FIG. 8A, housing 800 may include a housing substantially similar to that of the housing 100 discussed herein with respect to FIGS. 1A and 3A-3D. That is, housing 800 may be formed from a ceramic material and may be formed as a single body. However, housing 800 may be distinct from housing 100 in that housing 800 may be substantially fixed in its shape. More specifically, housing 800 may include recess 802 that may include a fixed or preformed geometry 804 that may not be altered or changed during subsequent processing on housing 800.

A portion of optical member 200 may be initially positioned within housing 800. More specifically, as shown in FIG. 8A, joined member 204a of optical member 200 may initially be positioned within a lower portion 850 of recess 802 of housing 800. As shown in FIG. 8A, joined member 204a may include a geometry substantially similar to the geometry 804 of recess 802 formed in the lower portion 850 of housing 800. Joined member 204a may be positioned within housing 800, and may also be coupled within housing 800 using a compression fit, as shown in FIG. 8A. In another non-limiting embodiment, joined member 204a initially positioned within recess 802 of housing 800 may be coupled to housing 800 using an adhesive or bonding agent 212 (see, FIG. 8C).

Once joined member 204a is positioned within recess 802 of housing 800, joined member 204b of optical member 200 may be positioned within housing 800. That is, and as shown in FIG. 8B, joined member 204b may be positioned within an upper portion 852 of recess 802 of housing 800 subsequent to the joined member 204a being positioned within lower portion 850. As shown in FIG. 8B, and as similarly discussed herein with respect to joined member 204a, joined member 204b may also be coupled to housing 800 using a compression fit and/or an adhesive bonding agent 212 (see FIG. 8C).

Additionally as shown in FIG. 8B, joined member 204b positioned in upper portion 852 of housing 800 may contact and/or be coupled to joined member 204a formed in lower portion 850. Joined member 204b may be coupled to joined member 204a to form optical component 200, as discussed herein with respect to FIG. 2A. As shown in FIG. 8B, joined member 204b may be coupled to joined member 204a using an optically transparent adhesive 254. Optically transparent adhesive 254 may be formed around the edges of contacting joined members 204a, 204b, or may be formed on the entire contacting or mating surface of joined members 204a, 204b. Additionally, and as discussed herein, transparent bonding agent 212 may include aesthetics, such as a texture or a visual component (e.g., a logo), formed therein, such that the aesthetics may be visible through joined member 204b of optical component 200.

FIG. 8C depicts formed optical member 200 positioned within and coupled to housing 800. As shown in FIG. 8C, and discussed herein, joined components 204a, 204b may be coupled to housing 800 using bonding agent 212. In a non-limiting example, bonding agent 212 may be flowed through housing 800 after joined members 204a, 204b are positioned within housing 800 and coupled to each other to form optical member 200. In the example, bonding agent 212 may settle in any gaps or spaces that may exist between optical component 200 and housing 800 for bonding optical component 200 to housing 800, as similarly discussed herein with respect to FIG. 4C. In another non-limiting example, as briefly discussed above, bonding agent 212 may be formed within recess 802 of housing 800 prior to positioning joined member 204a in lower portion 850, and/or positioning joined member 204b in upper portion 852. Additionally, and as discussed herein, as a result of the geometries of both the housing 800 and optical component 200, optical component 200 may be positioned within housing 800 and may not be removed.

Figure 9A:
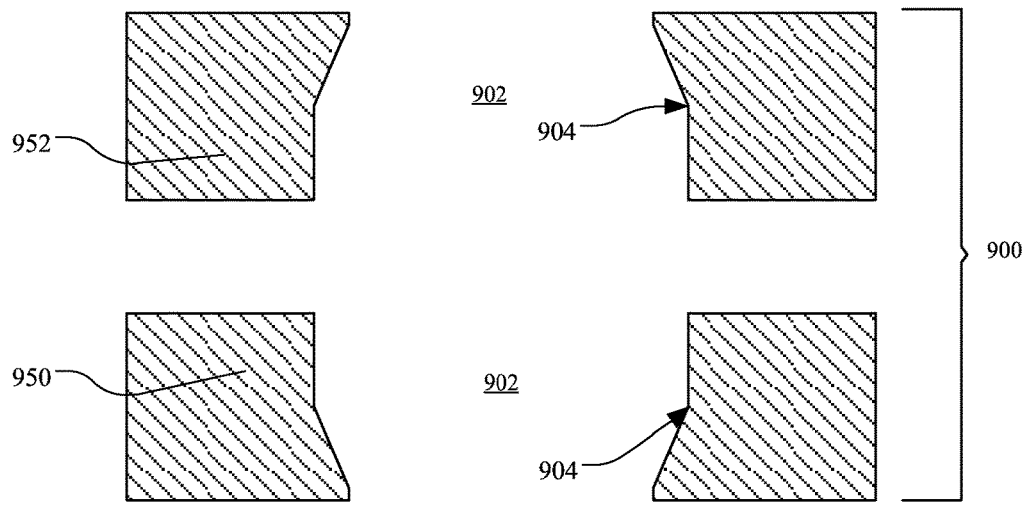
FIGS. 9A-9C are illustrative front cross-sectional views of a two-part interlocking ceramic housing and an optical member undergoing assembly processes, according to additional embodiments.
Figure 9B:
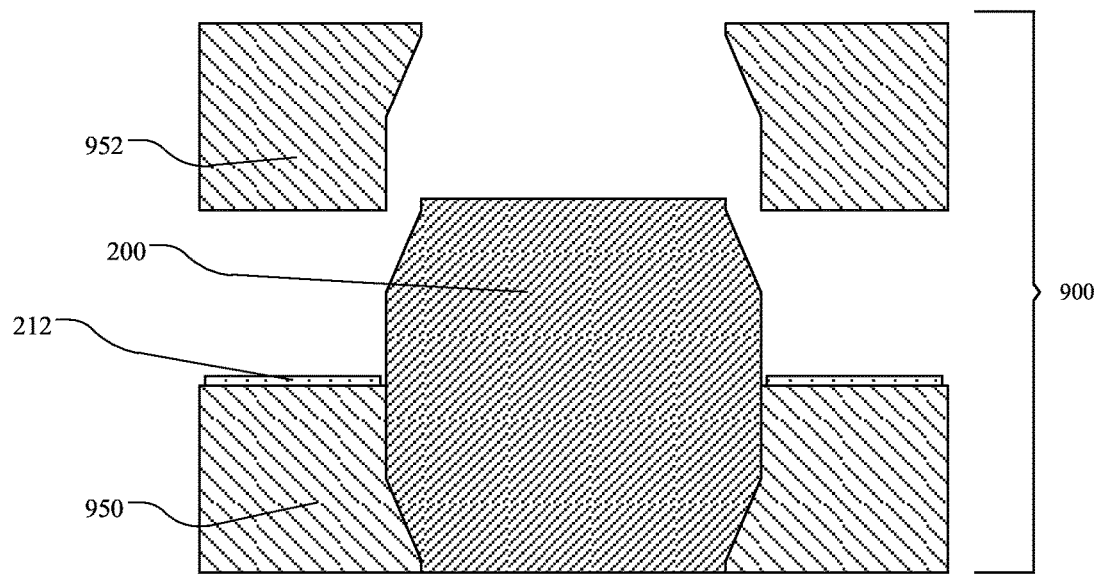
Figure 9C:
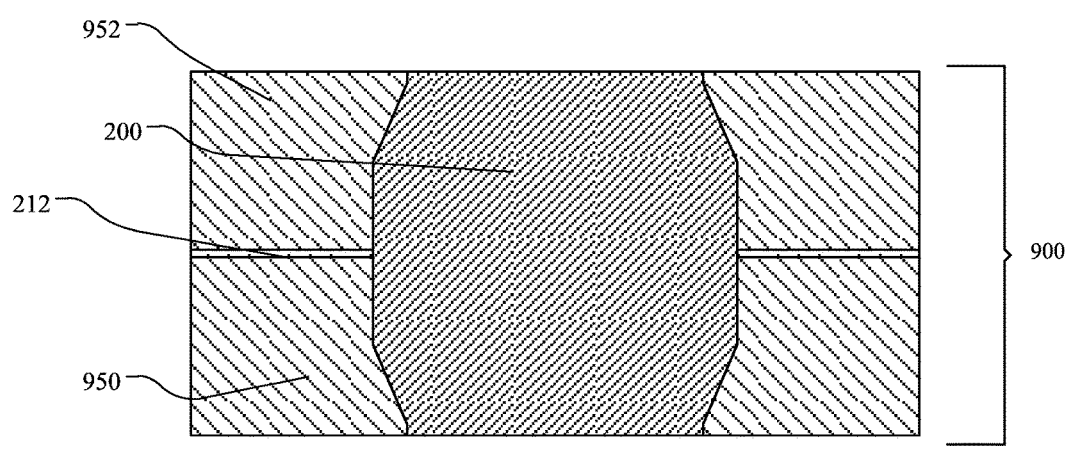

FIGS. 9A-9C depict illustrative cross-section views of the optical member 200 being positioned within another housing 900. More specifically, FIGS. 9A-9C depict optical member 200 coupled and/or fixed within housing 900 including a lower portion 950 and an upper portion 952.

FIG. 9A shows housing 900 including two distinct portions. Specifically, FIG. 9 depicts housing 900 including a lower portion 950 and an upper portion 952. Each of the lower portion 950 and upper portion 952 include a portion of recess 902 including a geometry 904. When coupled together, lower portion 950 and upper portion 952 may form recess 902 of housing 900 including a geometry 904 that may correspond to a geometry of optical member 200.

FIG. 9B shows optical member 200 positioned within recess 902 of lower portion 950 of housing 900. That is, single body optical member 200 may be positioned within and/or coupled to lower portion 950 of housing 900, as similarly discussed herein. Additionally, as shown in FIG. 9B, upper portion 952 of housing 900 may be aligned within lower portion 950. Specifically, upper portion 952 may be positioned above lower portion 950 and may align recess 902 of upper portion 952 with optical member 200 for subsequent coupling of upper portion 952 to lower portion 950 and/or optical component 200. As shown in FIG. 9B, lower portion 950 may also include bonding agent 212 positioned on a contact surface surrounding optical member 200. As discussed herein, bonding agent 212 may be used to couple upper portion 952 to lower portion 950 to forming housing 900.

FIG. 9C shows upper portion 952 of housing 900 contacting lower portion 950 of housing 900. More specifically, upper portion 952 may be coupled to lower portion 950 to form a complete housing 900. As shown in FIG. 9C, upper portion 952 of housing 900 may be coupled to lower portion 950 using bonding agent 212 formed between upper portion 952 and lower portion 950. Additionally, as shown in FIG. 9C, upper portion 952 of housing 900 may be coupled to optical member 200.

Figure 10A:
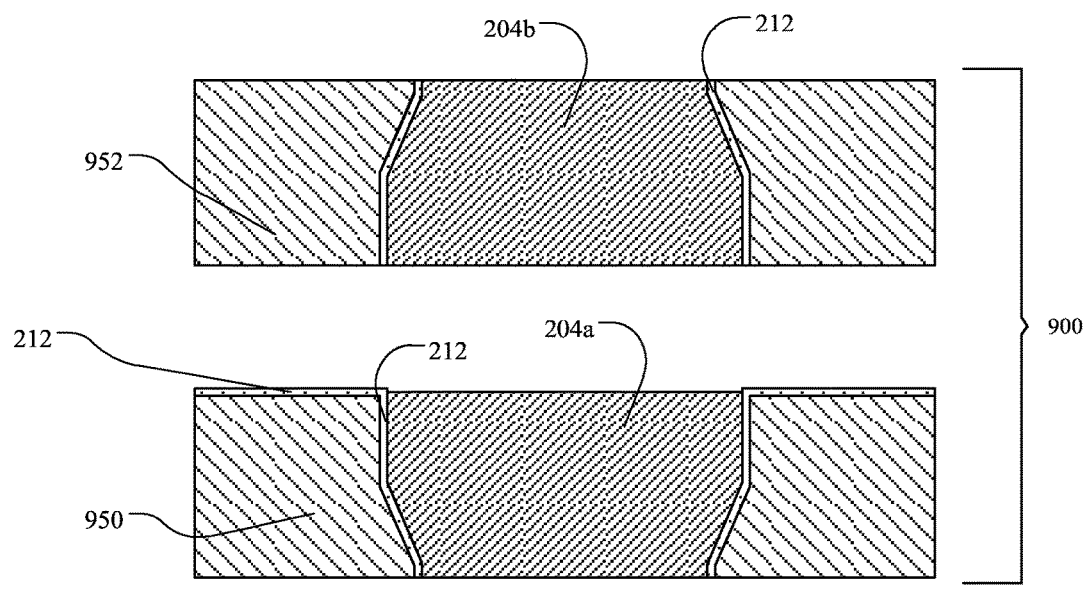
FIGS. 10A and 10B are illustrative front cross-sectional views of a two-part interlocking ceramic housing and a two-part optical member undergoing assembly processes, according to an additional embodiment.
Figure 10B:
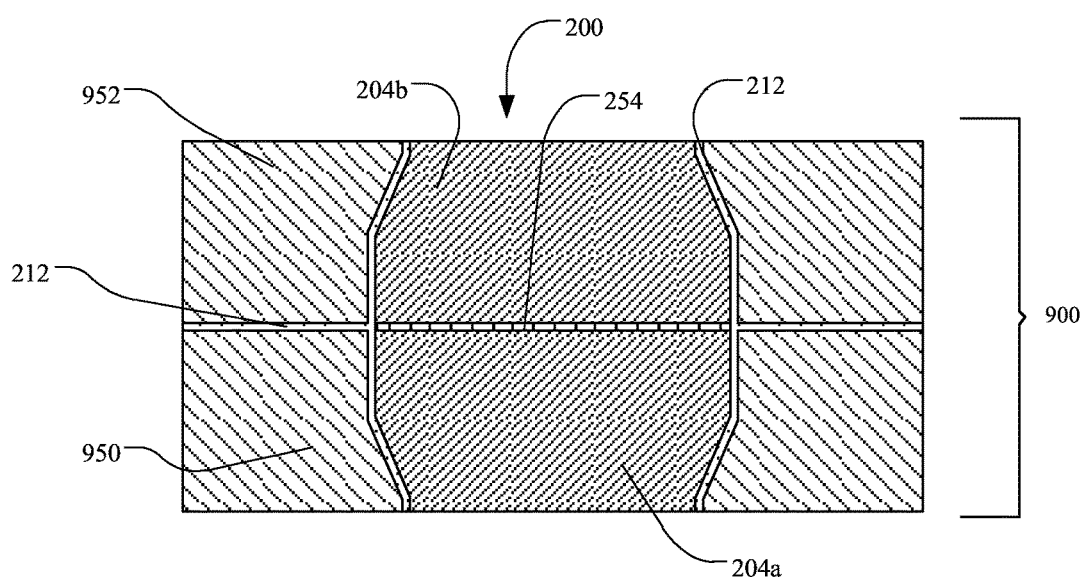

FIGS. 10A and 10B depict illustrative cross-section views of the optical member 200 being positioned within another housing 900 according to distinct embodiments. As shown in FIGS. 10A and 10B, optical component 200 may be formed from joined members 204a, 204b.

In an initial process, as shown in FIG. 10A, joined member 204a may be positioned within and/or coupled to lower portion 950 of housing 900. Joined member 204a may be coupled to lower portion 950 using bonding agent 212, as discussed herein. Additionally, as shown in FIG. 10A, joined member 204b of optical member 200 may be positioned within and/or coupled to upper portion 952 of housing 900 in a similarly fashion as joined member 204a in lower portion 950 (e.g., bonding agent 212, compression fit).

As shown in FIG. 10B, upper portion 952 of housing 900, including joined member 204b, may contact and/or be coupled to lower portion 950 including joined member 204a. As shown in FIG. 10B, and discussed herein with respect to FIG. 9C, upper portion 952 may be coupled to lower portion 950 using bonding agent 212 to form housing 900. Additionally as shown in FIG. 10B, and as similarly discussed herein with respect to FIGS. 8B and 8C, joined member 204b may be coupled to joined member 204a using optically transparent adhesive 254 to form optical member 200.

Although it is shown to position joined members 204a, 204b within the respective portions of housing 900 prior to the coupling of the portions of housing 900 and/or the coupling of joined members 204a, 204b, it is understood that distinct steps may be taken to form optical component 200 within housing 900. In another non-limiting example not shown, joined members 204a, 204b may be coupled to form optical component 200 prior to upper portion 952 being coupled to lower portion 950 to form housing 900. That is, joined member 204b may be coupled to joined member 204a to form optical member 200 within lower portion 950 of housing 900. This process may be similar to the process discussed herein with respect to FIGS. 9B and 9C. Once optical member 200 is formed from coupling joined members 204a, 204b, upper portion 952 may be subsequently coupled to lower portion 950 to form housing 900.

Figure 11:
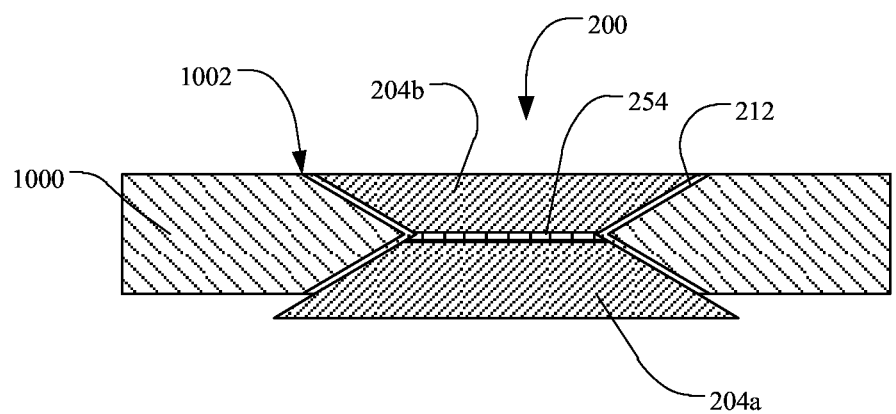
FIG. 11 is an illustrative front cross-sectional view of an interlocking ceramic housing and a two-part optical member including an extended portion, according to embodiments.
Figure 12:
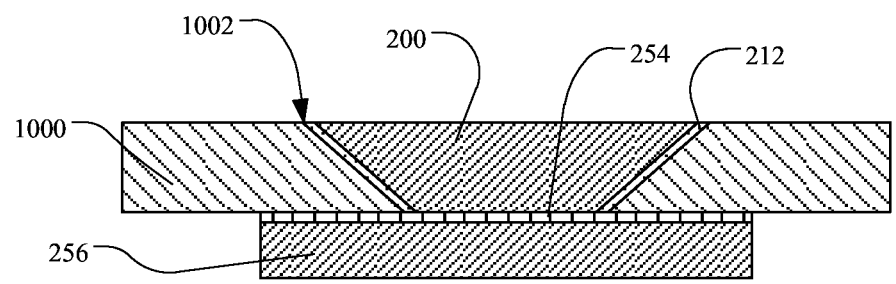
FIGS. 12 and 13 are illustrative front cross-sectional views of an interlocking ceramic housing, and optical member and a retention member, according to embodiments.
Figure 13:
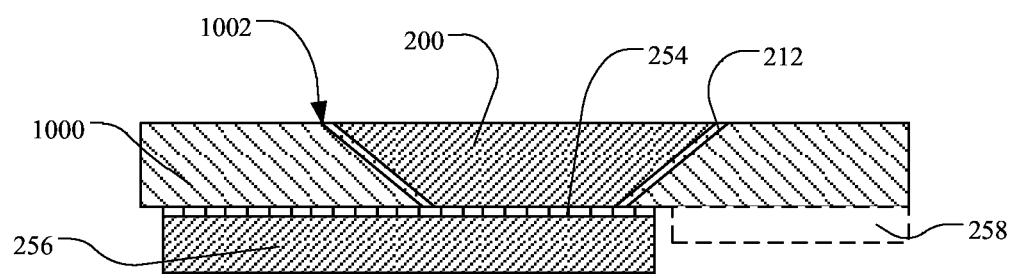

FIGS. 11-13 depict additional embodiments used for securing optical component 200 within housing 1000. Specifically, as shown in FIGS. 11-13, housing 1000 may be substantially thin and/or may not include a reduced thickness. As such, housing 1000 may be more fragile than a thicker housing (see, housing 100). Additionally, because housing 1000 includes a substantially reduced thickness, there may be less area to bond optical component 200 within recess 10002 of housing 1000.

As shown in FIG. 11, optical component 200 may be formed from joined members 204a, 204b, as similarly discussed herein. Joined members 204a, 204b may be fixed to one another using optically transparent adhesive 254, and may be coupled to housing 1000 using bonding agent 212. Additionally as shown in FIG. 11, joined member 204a extend from housing 1000. Specifically, joined member 204a may be designed to be oversized and/or longer than the portion of housing 1000 for which joined member 204a is coupled. The portion of joined member 204a may extend beyond housing 1000 to provide additional retention of joined member 204b and ultimately optical member 200 within housing 1000. That is, the portion of joined member 204a that may be larger than recess 1002 in housing 1000 may prevent optical component 200 from being removed form recess 1002 because of the differences in geometry between joined member 204a and recess 1002 of housing 100.

FIGS. 12 and 13 show the inclusion of a retention member 256 used to coupled optical member 200 within housing 1000 and to prevent undesirable removal of optical member 200 from housing 1000. Retention member 256 may be coupled to optical member 200 using optically transparent adhesive 254. Additionally, as shown in FIGS. 12 and 13, retention member 256 may also be coupled to a portion of housing 1000. In non-limiting examples, retention member 256 may be coupled to housing 1000 using optically transparent adhesive 254, as shown in FIGS. 12 and 13, or may be coupled to housing 1000 using bonding agent 212. As shown in FIGS. 12 and 13, retention member 256 may be substantially larger than recess 10002 of housing 1000 to prevent optical member from being removed from housing 1000 and/or to aid in the coupling of optical member 200 within housing 1000. As shown in FIG. 12, retention member 256 may be substantially centered on optical member 200. Distinctly, as shown in FIG. 13, retention member 256 may be substantially off-center when coupled to optical member 200 where a distinct internal component 258 may be positioned adjacent optical component 200. Retention member 256 may still provide the desired bonding and/or removal prevention to optical component 200 when off-center, so long as a portion of retention member 256 is coupled completely around or adjacent to recess 10002 of housing 1000.

As described above, in some embodiments, an optical member is disposed in a recess that is formed in a housing or ceramic member. In some embodiments, the recess may be formed in a clear member, including, for example, the cover glass, sapphire component or other optically transparent material. In some case, the recess may be formed in a member which may refer generically to a housing, ceramic member, cover glass, sapphire part, or other type of component.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An electronic device, comprising:
a housing defining an exterior surface and a recess having a recess geometry, the housing formed from a first ceramic material having a first coefficient of thermal expansion, the first ceramic material selected from the group consisting of: alumina, zirconia, carbides, borides, nitrides, and silicides; and
an optical member disposed in the recess and formed from a second ceramic material having a second coefficient of thermal expansion that is different than the first coefficient of thermal expansion, the optical member having a member geometry and configured to allow light into the housing through the recess, wherein:
the recess geometry includes an angled protrusion extending into a volume defined by the recess; and
the angled protrusion mechanically engages the member geometry such that the ceramic member prevents movement of the optical member within the recess along a first direction toward the exterior surface and along a second direction away from the exterior surface.

2. The electronic device of claim 1, wherein the housing and optical member define a gap-free interface.

3. The electronic device of claim 2, wherein:
the housing defines:
a first width at the exterior surface;
a second width at a depth within the recess, the second width less than the first width; and
the angled protrusion is defined by a tapered surface extending between the first and second widths.

4. The electronic device of claim 1, wherein the housing and the optical member expand toward one another at different rates in response to a heat input.

5. The electronic device of claim 1, wherein the optical member one of:
protrudes beyond the exterior surface of the housing; or
recedes below the exterior surface of the housing.

6. The electronic device of claim 1, wherein the second ceramic material is a sapphire glass material.

7. The electronic device of claim 1, further comprising:
a securement layer configured to affix the optical member and the housing, the securement layer comprising at least one of an adhesive, a chemical bonding agent, or a sealant.

8. The electronic device of claim 7, wherein the securement layer includes at least one of a zirconia or a ceramic slurry.

9. The electronic device of claim 1, wherein the optical member includes multiple distinct members joined at a contact surface.

10. The electronic device of claim 9, further comprising a transparent member positioned between the multiple members;
wherein the transparent member includes at least one of a logo, an optically transparent adhesive or a texture adhesive.

11. The electronic device of claim 1, wherein an inner surface of the housing defining the recess is coated with an ink.

12. The electronic device of claim 1, wherein the housing includes at least two distinct components coupled together using a bonding agent.

13. The electronic device of claim 1, further comprising a retention member coupled to the optical member, the retention member positioned adjacent the housing and outside of the recess.

14. The electronic device of claim 13, wherein the retention member is larger than the recess of the ceramic member.

15. A component, comprising:
a first member comprising a recess formed within a surface, the recess comprising:
a first portion defining a first interface surface; and
a second portion defining a second interface surface that differs from the first interface surface, the first and second interface surfaces adjoining at an edge within a volume defined by the recess; and
an optical member having a first, distinct joined member and a second, distinct joined member, the first, distinct joined member being disposed in the first portion and the second distinct, joined member being disposed in the second portion, the first, distinct joined member affixed to the second, distinct joined member within the recess,
wherein the first interface surface mechanically engages the first, distinct joined member and the second interface surface mechanically engages the second, distinct joined member such that the edge is positioned between the first and second, distinct joined members and prevents movement of the optical member along a first direction toward the surface and a second direction away from the surface.

16. The component of claim 15, further comprising:
a securement layer positioned between the first, distinct joined member and the second, distinct joined member, the securement layer configured to affix the first, distinct joined member of the optical member to the second, distinct joined member of the optical member within the recess.

17. The component of claim 15, wherein at least one of:
a size of the first member is configured to increase in response to a heat input such that a width of the recess decreases; or
a width of the optical member is configured to increase in response a heat input.

18. The component of claim 15, wherein the securement layer comprises at least one of:
an adhesive;
a chemical bonding agent; or
a sealant.

19. The component of claim 15, wherein the optical member is formed from a sapphire glass material.

20. The component of claim 15, wherein:
the first, distinct joined member defines a first geometry comprising:
a first width;
a second width that is less than the first width; and
a first tapered surface extending between the first and second widths;
the second, distinct joined member defines a second geometry comprising:
a third width;
a fourth width that is less than the third width; and
a second tapered surface extending between the third and fourth widths;
the first interface surface corresponds to the first geometry; and
the second interface surface corresponds to the second geometry.

21. The component of claim 20, wherein:
the first portion abuts the second portion; and
the second width is substantially the same as the fourth width.

22. An electronic device, comprising:
a housing formed from a first ceramic material having a first coefficient of thermal expansion, the first ceramic material selected from the group consisting of: alumina, zirconia, carbides, borides, nitrides, and silicides, the housing defining a recess extending into an enclosed volume and a first engagement feature within the recess; and
an optical member formed from a second ceramic material and having a second coefficient of thermal expansion that is less than the first coefficient of thermal expansion, the optical member positioned within the recess and having a second engagement feature contacting the first engagement feature, wherein
the first engagement feature prevents movement of the optical member both into and away from the enclosed volume of the housing.

23. The electronic device of claim 22, wherein:
the housing defines an exterior surface of the electronic device;
the recess extends between the exterior surface and the enclosed volume; and
the optical member is a lens positioned along the exterior surface.

24. The electronic device of claim 22, wherein:
the first ceramic material is opaque; and
the second ceramic material is translucent, thereby defining a light path into the enclosed volume through the recess.

25. The electronic device of claim 22, wherein:
the first engagement feature is a protruding portion of a sidewall of the housing that defines the recess; and
the second engagement feature is a groove defined by a side surface of the optical member.

26. The electronic device of claim 22, wherein the optical member comprises multiple, distinct layers of the second ceramic material connected to one another.

27. The electronic device of claim 26, wherein at least one of the multiple, distinct layers of the second ceramic material is positioned at least partially outside of the recess.

* * * * *